US012097534B2

(12) United States Patent
Sosnowski

(10) Patent No.: US 12,097,534 B2
(45) Date of Patent: Sep. 24, 2024

(54) DEVICE FOR SEPARATION AND REMOVAL OF IMPURITIES FROM GRANULAR MATERIAL

(71) Applicant: Wlodzimierz Sosnowski, Ciechanow (PL)

(72) Inventor: Wlodzimierz Sosnowski, Ciechanow (PL)

( * ) Notice: Subject to any disclaimer, the term of this patent is extended or adjusted under 35 U.S.C. 154(b) by 331 days.

(21) Appl. No.: 17/718,604

(22) Filed: Apr. 12, 2022

(65) Prior Publication Data

US 2022/0331839 A1 Oct. 20, 2022

(30) Foreign Application Priority Data

Apr. 20, 2021 (PL) ........................................ 437654

(51) Int. Cl.
*B07B 4/04* (2006.01)
*B07B 4/02* (2006.01)

(52) U.S. Cl.
CPC ................ *B07B 4/04* (2013.01); *B07B 4/025* (2013.01)

(58) Field of Classification Search
CPC .. B07B 9/02; B07B 4/02; B07B 4/025; B07B 4/04; B07B 7/04
See application file for complete search history.

(56) References Cited

U.S. PATENT DOCUMENTS 1,348,043 A * 7/1920 Parkinson ................ B07B 4/04 209/135
3,448,856 A * 6/1969 Thomson .................. B07B 4/04 209/150
3,904,515 A * 9/1975 MacKenzie ............. B07B 4/025 241/DIG. 38
4,058,455 A * 11/1977 Schier ..................... B07B 4/025 55/300
4,094,772 A * 6/1978 Hillekamp ................ B04C 9/00 209/699
4,470,902 A * 9/1984 Yoshimori ................ B07B 9/02 96/372
5,294,002 A * 3/1994 Moses ....................... B07B 4/02 209/150

(Continued)

FOREIGN PATENT DOCUMENTS

PL 205260 B1 3/2010
PL 238108 B1 7/2021
WO WO-2015114135 A1 * 8/2015 ............... B07B 4/04

*Primary Examiner* — Patrick H Mackey
(74) *Attorney, Agent, or Firm* — WHDA, LLP

(57) ABSTRACT

A device for separation and removal of light impurities from granular material has a cylindrical body, in the upper part of which is located a motor-driven fan that sucks air and an outlet channel for light impurities, below which there is axially mounted a feed channel connected to a container of granular material, and in the lower part of the body there is axially located a cylinder with an outer diameter smaller than the inner diameter (d) of the body, containing a centrifugal guide located under the outlet of the feed channel, whereas below the centrifugal guide, on the inner wall of the cylinder are fixed uniformly spaced directing plates at a certain distance from each other, their ends being pointed towards the axis of the device, and between the body and the cylinder there is a chute for purified material. There is a plurality of openwork hinders.

17 Claims, 2 Drawing Sheets

(56) References Cited

U.S. PATENT DOCUMENTS

| | | | | | |
|---|---|---|---|---|---|
| 5,993,903 | A * | 11/1999 | Toepfer | A01C 1/06 427/242 |
| 6,405,405 | B1 * | 6/2002 | Hauch | B07B 11/04 15/345 |
| 6,889,843 | B1 * | 5/2005 | Longhurst | B07B 4/04 209/139.1 |
| 7,021,572 | B2 * | 4/2006 | Heeb | B07B 4/04 241/12 |
| 10,702,890 | B2 * | 7/2020 | Sosnowski | B07B 4/04 |
| 2020/0290087 | A1 | 9/2020 | Sosnowski | |
| 2020/0337215 | A1 | 10/2020 | Sosnowski | |
| 2021/0187552 | A1 * | 6/2021 | Schneider | B07B 11/06 |

* cited by examiner

DEVICE FOR SEPARATION AND REMOVAL OF IMPURITIES FROM GRANULAR MATERIAL

BACKGROUND

The object of the invention is a device for separation and removal of impurities from granular material, especially cereal grains, grass seeds and leguminous plant seeds, as well as plastic granules.

From the description of U.S. Patent No. U.S. Ser. No. 10/702,890 B2, belonging to the applicant of the present invention, is known a device for separation and removal of light impurities from granular material, having a body in the upper part of which there is positioned a fan that sucks air in, driven by a motor and an outlet channel for light impurities provided with an adjustable aperture, and in the middle part there is axially mounted a hopper connected to the inlet of granular material, whereas in the lower part of the device there is a module in the form of a centripetal guide consisting of a cylindrical housing, on the inner surface of which there are directing plates evenly spaced at a certain distance from each other in various transverse planes, their ends being pointed towards the axis of the device so that the plates in one plane are displaced relative to the plates in an adjacent plane, wherein between the hopper and the centrifugal guide with directing plates, which is a separate module, there is a module in the form of a cylinder, inside which there is a centrifugal guide in the form of an axial member on the surface of which, in various transverse planes, there are mounted directing elements with their ends being pointed towards the inner wall of the cylinder. The axial member may have a cylindrical surface or may have the shape of a regular polygon in cross-section. The directing elements are attached to the axial member at equal angular distances between each other in each transverse plane, the elements in one plane being offset from the elements in an adjacent plane by half of the angular distance between elements, or they may be attached to the axial member at different angular distances between each other in each transverse plane, in such case the elements in one plane are positioned in gaps between elements in an adjacent plane. The directing elements are bent away from the surface of the axial member by an angle not smaller than 260 and not bigger than 78°, whereas the directing elements may have a rectilinear or curvilinear outline, and in the case of curvilinear ones they are fixed tangentially to the surface of the axial member. The curvilinear directing elements may have a radial outline with a radius of the curvature which amounts from 0.07 to 0.25 of the inner diameter of the cylinder. The ratio of the total area of all the directing elements visible in an axial view in all planes to the area of cross-section of the interior of the hopper amounts from 0.7 to 1.4, whereas the ratio of the total area of the directing elements in one transverse plane to the area of the cross-section of the interior of the hopper amounts from 0.0016 to 0.0189, and the ratio of the total area of the directing elements in one transverse plane to the area of cross-section of the interior of the cylinder amounts from 0.0007 to 0.0044. The outer diameters of the modules are similar to each other and correspondingly similar to the outer diameter of the body of the device. In order to achieve thorough purification of granular material falling by gravity, it is required to use repeated alternate positioning of centrifugal and centripetal modules, however it increases the overall dimensions of the device and significantly increases its cost. Moreover heavier impurities such as grain ears or granulate fragments can fall by gravity together with the purified material. In order to obtain fully purified material, it is necessary to use appropriate screens located under the outlet of the device, for example screens known from the description of the invention of U.S. Patent No. U.S. Ser. No. 11/325,158 B2. In the description of Polish patent PL205260, belonging to the applicant of the present invention, which also relates to an air grain separator for separating impurities from granular material, there is presented a construction in which purified material falls out of the body through oblique troughs positioned between the outer casing and the inner casing. Further in U.S. Patent No. U.S. Ser. No. 11/540,436 B2, also owned by the applicant of the present invention, there is shown a construction of a device for coating surface of granular material or granules, wherein a vertical, cylindrical, through body is used, provided with alternate centrifugal guide modules in the form of an axial member with a plurality of guide elements being pointed towards the inner wall of the body, and centripetal guide modules in the form of a plurality of directing plates positioned on the inner wall of the module with the their ends being pointed towards the axis of the body, and in the body above the upper module with the centrifugal guide, there is axially mounted a hopper connected to a container of grain material, the body being positioned inside a cylindrical housing, whereas in the upper part of the housing, above the body, there is axially mounted a motor-driven fan. Below the upper module with a centrifugal guide there is axially positioned a nozzle supplying a coating agent, being pointed towards a dispersing screen with small openings, which forms a cover for a chamber axially positioned below the nozzle and connected to an external blower, wherein a cover is positioned above the nozzle in the vertical axis of the body, and a centripetal guide module is positioned below the chamber, below which another centrifugal guide module is positioned, the lower end of the body being a centripetal guide module. The upper end of the body is tightly closed and the lower end of the body is open forming a discharge hopper of coated material, the body being attached to a stationary frame. The upper open end of the housing is positioned below the fan, and in the housing above the hopper there is a rotary throttle mounted perpendicularly to the vertical axis of the housing. The ratio of the area of the cross-section of the casing to the area of the cross-section of the casing amounts from 1.3 to 8. The feed hopper is closed at the top with a cover having the shape of a spherical bowl, whereas the cover located below the feed hopper also has the shape of a spherical bowl with a base diameter larger than the diameter of the chamber covered with a dispersing sieve having small openings. Also the sieve has advantageously the shape of a spherical bowl, wherein alternatively the sieve may have the shape of a cone. The ratio of the area of the cross-section of the body to the area of the dispersing sieve amounts from 6 to 70. The apparatus may have a plurality of centrifugal guide modules and centripetal guide modules alternately located below the chamber connected to the blower. The apparatus disclosed herein allows for even mortar coverage of purified granular material, however it is not suitable for purifying such material.

SUMMARY OF THE INVENTION

The purpose of the present invention is to further improve the efficiency of purifying granular material with the possibility of separating both light and heavy impurities in the form of stones, ears, straw and weed grains from the material being purified, based on the cooperation of the raising air current, the action of centrifugal forces and the shape of the surfaces of hinder plates.

The essence of the invention is a device structure for separation and removal impurities from granular material, having a vertical cylindrical body, in the upper part of which there is located a motor-driven fan that sucks air and an outlet channel for light impurities, below which there is axially mounted a feed channel connected to a container of granular material, and in the lower part of the body there is axially located a cylinder with the outer diameter smaller than the inner diameter of the body, comprising a centrifugal guide in the form of an axial member on the surface of which there are mounted directing elements with their ends being pointed towards the inner wall of the cylinder, said centrifugal guide being located under the outlet of the feed channel, whereas below the centrifugal guide, on the inner wall of the cylinder there are mounted directing plates evenly spaced from each other, their ends being pointed towards the axis of the device, and between the body and the cylinder there is a chute for purified material in the form of two symmetrical troughs connected together at the top, wrapping up spirally around the cylinder. According to the invention there is a plurality of openwork hinder plates fixed to the outer surface of the feed channel, in various transverse planes in each plane, their ends being pointed obliquely upwards towards the inner wall of the body, and inside the feed channel, above the outlet there is axially located a multi-conical reducer slowing down the gravitational flow of the granular material. The openwork hinder plates are fixed to the surface of the feed channel at an angle of not smaller than 25° and not bigger than 75°, whereas the outer surface of the feed channel may be cylindrical or may be a regular polygon in cross-section. The multi-conical reducer comprises an inverted open truncated cone below which is positioned a smaller dispersing cone, the outlet of the feed channel being funnel shaped. The ratio of the area of the cross-section of the interior of the feed channel to the area of the cross-section of the interior of the body amounts from 0.012 to 0.2, whereas the ratio of the area of the cross-section of the interior of the cylinder to the area of the cross-section of the interior of the body amounts from 0.1 to 0.85. Said openwork retaining plates may be attached to the surface of the feed channel at equal angular distances between each other in each transverse plane, whereas the plates in one plane are offset from the plates in an adjacent plane by half of the angular distance between the plates, or they may be attached at different angular distances between each other in each transverse plane, whereas the plates in one plane are positioned in the gaps between the plates in an adjacent plane. The ratio of the entire surface area of all the said hinder plates in all transverse planes in a plan view, to the surface area of the cross-section of the interior of the body amounts from 0.3 to 0.95. The openwork hinder plates have small through-openings on their entire surface. The total surface area of all the through-openings on each hinder plate covers from 5% to 60% of the surface area of the plate, wherein the surface area of the hinder plates may be a rectangle or the hinder plates may have an arched outline with a radius of curvature from 0.3 to 5.0 of the body interior diameter. In the lower part of the body, near the end of the troughs of the chute, there is an outlet opening for purified material provided with a hinged flap. The structure of the device makes it possible to obtain thoroughly cleaned material free of both light and heavy impurities. As a result of segregation, heavy impurities fall out by gravity from the end of the cylinder and light impurities are discharged through an outlet channel located in the upper part of the body, whereas thoroughly purified material is discharged outside of the body under a hinged flap.

DESCRIPTION OF THE DRAWINGS

A device according to the invention is presented in an embodiment in the drawing, where.

DETAILED DESCRIPTION

Figure 1:
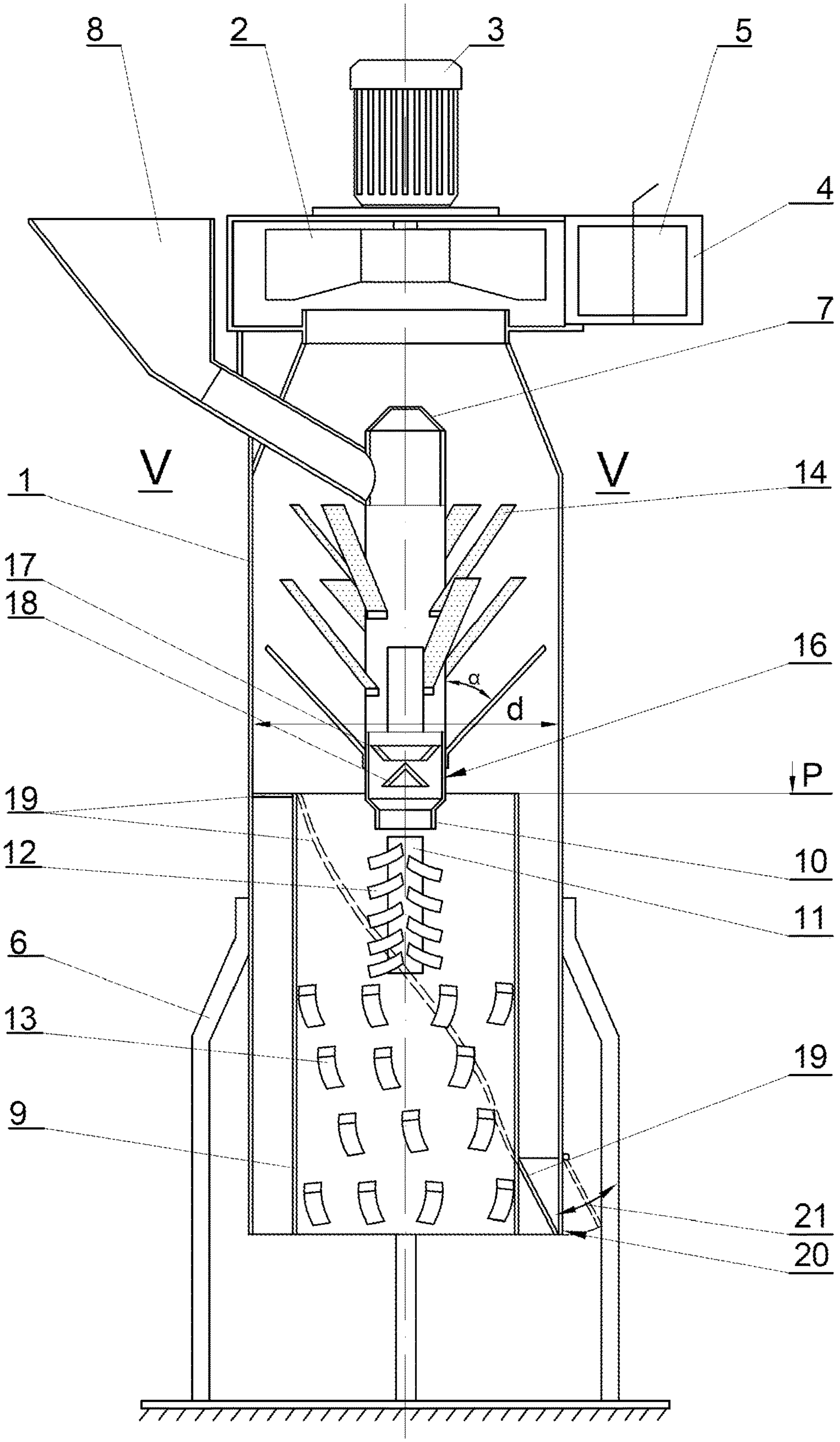
FIG. 1 presents a schematic view of the device in axial section showing openwork hinder plates arranged on the surface of the feed channel in three different transverse planes, FIG. 2—a view of the feed channel, with hinder plates having curved outline, FIG. 3—the device of FIG. 1 in V-V cross-section showing hinder plates in a plan view, and FIG. 4—a single rectangular hinder plate in a perspective view.
Figure 2:
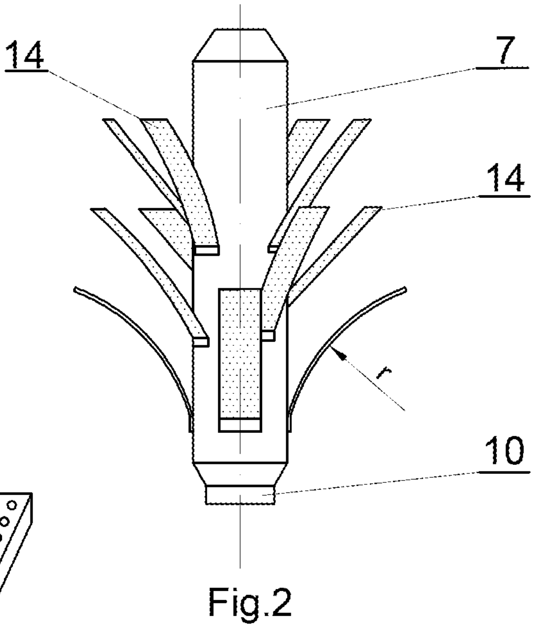
Figure 4:
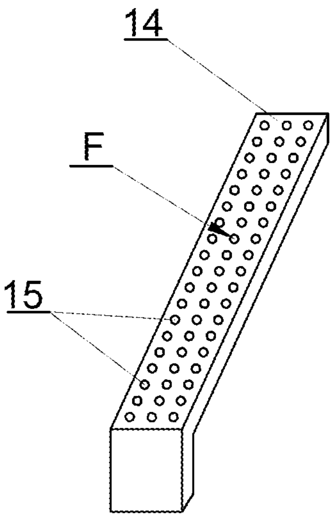
Figure 3:
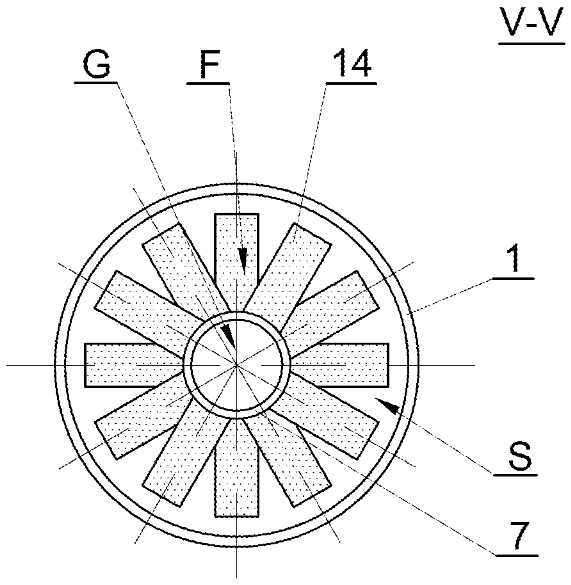

A device according to the invention has a cylindrical body 1, in the upper part of which there is positioned a fan 2 that sucks air, driven by a motor 3, and an outlet channel 4 for light impurities, the outlet channel being provided with an adjustable aperture 5. The body 1 is mounted on a support structure 6 such that its end is positioned above the ground level. Below the fan 2, in the axis of the body 1, there is positioned a feed channel 7 being closed at the top, connected to an external container 8 of granular material. In the lower part of the body 1 there is axially located a cylinder 9 with an outer diameter smaller than the inner diameter d of the body 1. Inside the cylinder 9, under the outlet 10 of the feed channel 7, there is a centrifugal guide in the form of an axial member 11, on the surface of which there are fixed directing elements 12 with their ends being pointed towards the inner wall of the cylinder 9. Underneath the centrifugal guide, on the inner wall of the cylinder 9, there are fixed, evenly spaced at a certain distance from each other, directing plates 13 with their ends being pointed towards the axis of the device, the directing plates constituting the centripetal guide. On the outer surface of the feed channel 7, in various transverse planes, there are fixed a plurality of openwork hinder plates 14 in each plane, their ends being pointed obliquely upwards towards the inner wall of the body 1. The hinder plates 14 are fixed on the surface of the feed channel 7 at an angle from 25° to 75°, preferably 45°. The outer surface of the feed channel 7 may be cylindrical or may have the shape of a regular polygon in cross-section. The openwork of the hinder plates 14 is obtained by a plurality of small through-openings 15 made on the entire surface F of the plate 14, whereby the total surface area of all the through-openings 15 may cover from 5% to 60% of the surface F of the hinder plate 14. The surface F of the hinder plates 14 is a rectangle, whereby the plates 14 may have an arched outline with a radius of curvature r which amounts from 0.3 to 5.0 of the inner diameter d of the bod The value of the ratio of the area G of the cross-section of the interior of the feed channel 7 to the area S of the cross-section of the interior of the body 1 amounts from 0.012 to 0.2, whereas the value of the ratio of the area P of the cross-section of the interior of the cylinder 9 to the area S of the cross-section of the interior of the body 1 amounts from 0.1 to 0.85. The openwork hinder plates 14 can be attached to the surface of the feed channel 7 at equal angular distances between each other in each transverse plane, the plates 14 in one plane being shifted with respect to the plates 14 in an adjacent plane by half of the angular distance between the plates 14. Alternatively, the openwork hinder plates 14 can be attached to the surface of the feed channel 7 at different angular distances between each other in each transverse plane, the plates 14 in one plane being positioned in the gaps between the plates 14 in an adjacent plane. The ratio of the total surface area F of all hinder plates 14 visible in a plan view in all transverse planes in the cross-section V-V in FIG. 3 to the surface area S of the cross-section of the interior of the body 1 amounts between 0.3 and 0.95. Inside the feed channel 7, above the outlet 10, there is axially positioned a multi-conical reducer 16 for slowing down the gravitational flow of the fed granular material, which consists of an inverted open truncated cone 17 below which is provided a smaller dispersing cone 18, the outlet 10 of the feed channel 7 being funnel-shaped. In the space between the body 1 and the cylinder 9, there is a chute for purified material consisting of two symmetrical troughs 19 connected to each other at the top edge of the cylinder 9 and wrapping up spirally around the cylinder 9 so that their ends are positioned at the outlet opening 20 for the purified material arranged radially in the body 1, at its lower edge, on the opposite side in relation to the connection of the troughs 19. The outlet opening 20 is covered by a tilting flap 21 hingedly mounted on the body 1.

The operation of the device is effected as follows: the granular material to be purified, located in the external container 8, flows by gravity into and down the feed channel 7, and falls onto the inverted open cone 17 and further onto the dispersing cone 18 of the multi-conical reducer 16 thus losing its kinetic energy and with the speed slowed down, it falls out through the funnel-shaped opening 10 directly onto the directing elements 12 of the centrifugal guide, which, dispersing the material evenly in space, transfer it towards the directing plates 13 constituting the centripetal guide. The material thus dispersed is forced in the opposite direction by the stream of air sucked in by the fan 2, which snatches the purified material together with light impurities upwards towards the openwork hinder plates 14, whereas heavy contaminants such as stones, ears or weed seeds fall out through the bottom of the cylinder 9. Light impurities in the air stream enter upwardly between the openwork plates 14 and the space between the ends of the plates 14 and the inner surface of the body 1, as well as through the through-openings 15 in the plates 14 and are removed through the outlet channel 4 to the outside, whereas the purified granular material loses kinetic energy onto the surfaces of the hinder plates 14, moving towards the inner wall of the body 1, and then slides by gravity along this wall onto the troughs 19 of the chute, along which it is led to the outlet opening 20. The pushing material causes tilting of the flap 21 thus enabling the discharge.

The invention claimed is:

1. A device for separation and removal of light impurities from granular material, comprising:
- a vertical cylindrical body, in an upper part of which is located a motor-driven fan that sucks air and an outlet channel for light impurities, below which axially mounted a feed channel connected to a container of granular material, and in a lower part of the body is axially located a cylinder with an outer diameter smaller than an inner diameter of the body; and
- a centrifugal guide in a form of an axial member on a surface of which are mounted directing elements with respective ends of the directing elements being pointed towards the inner wall of the cylinder, said centrifugal guide being located under an outlet of the feed channel, wherein
- directing plates are mounted below the centrifugal guide, on the inner wall, evenly spaced from each other, with respective ends of the directing plates being pointed towards the axis of the device,
- a chute for purified material is disposed between the body and the cylinder, the chute having two symmetrical troughs connected together at the top, wrapping up spirally around the cylinder,
- a plurality of openwork hinder plates are fixed to an outer surface of the feed channel, in various transverse planes in each plane, with respective ends of the openwork hinder plates being pointed obliquely upwards towards the inner wall of the body, and
- a multi-conical reducer is axially located inside the feed channel, above the outlet of the feed channel, the multi-conical reducer slowing down the gravitational flow of the granular material.

2. The device according to claim 1, wherein the hinder plates are fixed to the outer surface of the feed channel at an angle (α) which fulfils the condition $25° \leq \alpha \leq 75°$.

3. The device according to claim 1, wherein the outer surface of the feed channel is cylindrical.

4. The device according to claim 1, wherein the outer surface of the feed channel forms a regular polygon in cross-section.

5. The device according to claim 1, that wherein the multi-conical reducer includes an inverted open truncated cone and a smaller dispersing cone located below the inverted open truncated cone.

6. The device according to claim 1, wherein the outlet of the feed channel is funnel-shaped.

7. The device according to claim 1, wherein the ratio of an area (G) of a cross-section of an interior of the feed channel to an area (S) of a cross-section of an interior of the body fulfils the condition $0.012 \leq G/S \leq 0.2$.

8. The device according to claim 1, wherein the ratio of an area (P) of a cross-section of an interior of the cylinder to an area (S) of a cross-section of an interior of the body fulfils the condition $0.1 \leq P/S \leq 0.85$.

9. The device according to claim 1, wherein the openwork hinder plates are fixed to the outer surface of the feed channel at equal angular distances between each other in each transverse plane, the plates in one plane being shifted with respect to the plates in an adjacent plane by half of an angular distance between the plates.

10. The device according to claim 9, wherein a ratio of a total surface area (F) of all the hinder plates in all transverse planes in a plan view to a surface area (S) of a cross-section of an interior of the body (1) fulfils the condition $0.3 \leq F/S \leq 0.95$.

11. The device according to claim 1, wherein the openwork hinder plates (14) are fixed to the outer surface of the feed channel at different angular distances between each other in each transverse plane, the plates in one plane being positioned in the gaps between the plates in an adjacent plane.

12. The device according to claim 11, wherein a ratio of a total surface area (F) of all the hinder plates in all transverse planes in a plan view to a surface area (S) of the cross-section of an interior of the body fulfils the condition $0.3 \leq F/S \leq 0.95$.

13. The device according to claim 1, wherein the openwork hinder plates have small through-openings.

14. The device according to claim 13, wherein a total surface area of all the through-openings on each hinder plate covers from 5% to 60% of a surface area of the respective hinder plate.

15. The device according to claim 1, wherein a surface of each of the hinder plates is a rectangle.

16. The device according to claim 15, wherein the hinder plates have an arched outline with a radius of curvature (r) which fulfils the condition $0.3 \leq r/d \leq 5.0$, wherein (d) is an inner diameter of the body.

17. The device according to claim 1, wherein another outlet for the purified material is radially positioned in the lower part of the body, near an end of troughs, the another outlet for the purified material having a hinged flap.

* * * * *